(12) United States Patent
Halling

(10) Patent No.: US 6,588,761 B2
(45) Date of Patent: *Jul. 8, 2003

(54) MULTIPLE-PLY RESILIENT SEAL

(75) Inventor: Horace P. Halling, Durham, CT (US)

(73) Assignee: Jetseal, Inc., Spokane, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/968,888

(22) Filed: Oct. 3, 2001

(65) Prior Publication Data
US 2002/0125650 A1 Sep. 12, 2002

Related U.S. Application Data

(63) Continuation of application No. 09/277,710, filed on Mar. 26, 1999, now Pat. No. 6,325,392.

(51) Int. Cl.[7] ............. F16J 15/02; F16J 15/08; F16L 21/05
(52) U.S. Cl. .............. 277/312; 277/314; 277/603; 277/626; 277/627; 277/654
(58) Field of Search ............... 277/312, 314, 277/603, 608, 613, 614, 615, 626, 630, 631, 635, 644, 647, 648, 651, 654, 924

(56) References Cited

U.S. PATENT DOCUMENTS

| | | |
|---|---|---|
| 685,610 A | 10/1901 | Huhn |
| 2,569,778 A | 10/1951 | Phillips |
| 2,631,908 A | 3/1953 | Teetor |
| 3,012,802 A | 12/1961 | Waite |
| 3,180,662 A | 4/1965 | Parlasca et al. |
| 3,192,690 A | 7/1965 | Taylor |
| 3,272,521 A | 9/1966 | McNenny |
| 3,575,432 A | 4/1971 | Taylor |
| 3,588,131 A | 6/1971 | Nicholson |
| 3,751,048 A | 8/1973 | Rode |
| 3,761,102 A | 9/1973 | Nicholson |
| 3,797,836 A | 3/1974 | Halling |
| 3,857,572 A | 12/1974 | Taylor et al. |
| 4,121,843 A | 10/1978 | Halling |
| 4,199,151 A | 4/1980 | Bartos |
| 4,316,348 A | 2/1982 | Adell |
| 4,589,666 A | 5/1986 | Halling |
| 4,602,795 A | 7/1986 | Lillibridge |
| 4,756,332 A * | 7/1988 | Grasseschi ............ 137/360 |
| 4,759,555 A | 7/1988 | Halling |
| 4,779,901 A | 10/1988 | Halling |
| 4,784,397 A | 11/1988 | Tozer |
| 4,798,392 A | 1/1989 | Tozer |
| 4,813,692 A | 3/1989 | Halling et al. |
| 4,854,600 A | 8/1989 | Halling et al. |
| 5,240,263 A | 8/1993 | Nicholson |
| 5,249,814 A | 10/1993 | Halling |
| 5,368,069 A | 11/1994 | Felber |
| 5,433,456 A | 7/1995 | Nicholson |
| 5,435,576 A | 7/1995 | Rode |
| 5,505,498 A | 4/1996 | Halling et al. |
| 5,533,736 A | 7/1996 | Yamaga |
| 5,630,593 A | 5/1997 | Swensen et al. |
| 5,716,052 A | 2/1998 | Swensen et al. |
| 6,227,546 B1 * | 5/2001 | Halling ............ 277/312 |
| 6,299,178 B1 * | 10/2001 | Halling ............ 277/644 |

* cited by examiner

*Primary Examiner*—Anthony Knight
*Assistant Examiner*—Vishal Patel
(74) *Attorney, Agent, or Firm*—Baker & Hostetler LLP

(57) ABSTRACT

A seal features a first ply and a second ply, each ply having at least one convolution. Leg termination regions connect the plies, such that a substantially enclosed volume is created between said first and second surfaces. Additional plies may be disposed between the first and second plies, the material of the additional plies having substantially the same convoluted shape of the first and second surfaces and being disposed within the envelope created between the first and second surfaces. The seal of the present invention may be formed of tube or strip stock. A seal formed of strip stock may have its edges, running about the circumference of the seal, either abutting, overlapping, or welded to each other.

7 Claims, 10 Drawing Sheets

MULTIPLE-PLY RESILIENT SEAL

THIS APPLICATION IS A CONTINUATION OF SER. NO. 09/277,710 FILED Mar. 26, 1999 NOW U.S. PAT. NO. 6,325,392.

FIELD OF INVENTION

The invention relates to a resilient seal.

BACKGROUND OF INVENTION

Since the introduction of highly resilient, pressure-energized metallic sealing rings, such as that according to U.S. Pat. No. 3,797,836, in the early 1970's, temperatures and pressures in turbine engines, where such rings may be employed, have increased substantially. Increased operating temperatures and pressures have caused the magnitude of the displacements between cooperating members of sealing surfaces to correspondingly increase. These cooperating sealing surfaces must seal together, under all operating conditions, to contain, for example, working gases at temperatures up to 1800° F. and cooling air at over 1200° F.

One way to provide effective sealing for the increasingly large and variable displacement between cooperating members of sealing surfaces is by providing multiple convolutions between cantilever sealing members at each end of a sealing ring, as shown, for example, in U.S. Pat. No. 4,121,843. As displacement continued to increase, a further response was desired. This came in the form of multiple-ply sealing ring construction, in which the thinner plies, capable of containing the fluid under pressure, when used in layers, provided the capacity for up to two or more times the deflection at a given stress level compared to single-ply seals. U.S. Pat. Nos. 5,249,814 and 5,716,052 describe sealing rings using multiple-ply technology.

Multiple-ply sealing rings, such as that described in U.S. Pat. No. 5,249,814, can be expensive because, for example, a seal may be required to have its edges welded together to prevent the ingress of pressurized media between the plies, where such ingress would cause overstressing of the material of the ply at the greatest distance from the higher pressure source. Seals such as that disclosed in U.S. Pat. No. 5,716,052 overcame that cost barrier associated with use of multiple plies by folding over the edges at each end of the seal section. For illustration purposes, a cross-section of a seal 1000 according to U.S. Pat. No. 5,716,052, is depicted in FIG. 10. By folding over the edges 1002, 1004, 1006, and 1008 at each end of the seal 1000, so that the openings to the interstitial space 1010 between the plies 1012 and 1014 were exposed to the lower pressure zone instead of the higher pressure medium being sealed, the seal 1000 depicted in FIG. 10 prevented the ingress of pressurized media between the plies.

However, because each of the bends at the folded ends of seals, such as a seal depicted in FIG. 10, have two thicknesses of seal material for every ply of the seal, such seals had several disadvantages. Among the disadvantages were stiffness at the termination regions (i.e., the folded ends in the region of the seal's sealing lines), where flexibility is needed; inactivity at the tightly folded edges of the seal, providing no flexibility to accommodate longitudinal axial displacement; and the consumption of critically necessary axial space.

A seal consisting of three plies, such as are described in U.S. Pat. No. 5,716,052 has six layers of material and three folds at each end.

SUMMARY OF INVENTION

In one aspect, a seal according to the present invention has a first surface, which may be, for example, a pressure-facing ply and a second surface, which may be, for example, a non-pressure-facing ply. The plies are joined at the free ends of the seal by leg termination regions. Leg termination regions form the rounded end portions of an interstitial space, which exists between the first and second surfaces, or plies.

In another aspect, the first surface is comprised of a convolution region, two acute bend regions, and two leg regions. The convolution region is comprised of a curved region, which can be any curved or compound curved shape (e.g., a partial circle or a partial ellipse) and two sidewall regions. Each sidewall region extends between the curved region and an adjoining acute bend region. The second surface is comprised of a convolution region, two acute bend regions, and two leg regions. The convolution region is comprised of a curved region, which can be any curved or compound curved shape (e.g., a partial circle or a partial ellipse) and two sidewall regions. Each sidewall region extends between the curved region and an adjoining acute bend region. The first surface and the second surface are joined by leg termination regions. The regions may form a unitary structure.

In other aspects, a seal according to the present invention may have at least one layer of material disposed between the first and second surfaces, or plies, of the seal. Such an inter-ply surface is substantially enveloped by the outermost first and second surface plies. A seal according to the present invention may also be formed in multiple-convolutions, wherein the layers or plies of the seal may have substantially the same convoluted shape and are disposed, more or less, adjacent to each other.

DETAILED DESCRIPTION OF THE PREFERRED EMBODIMENTS

Figure 1:
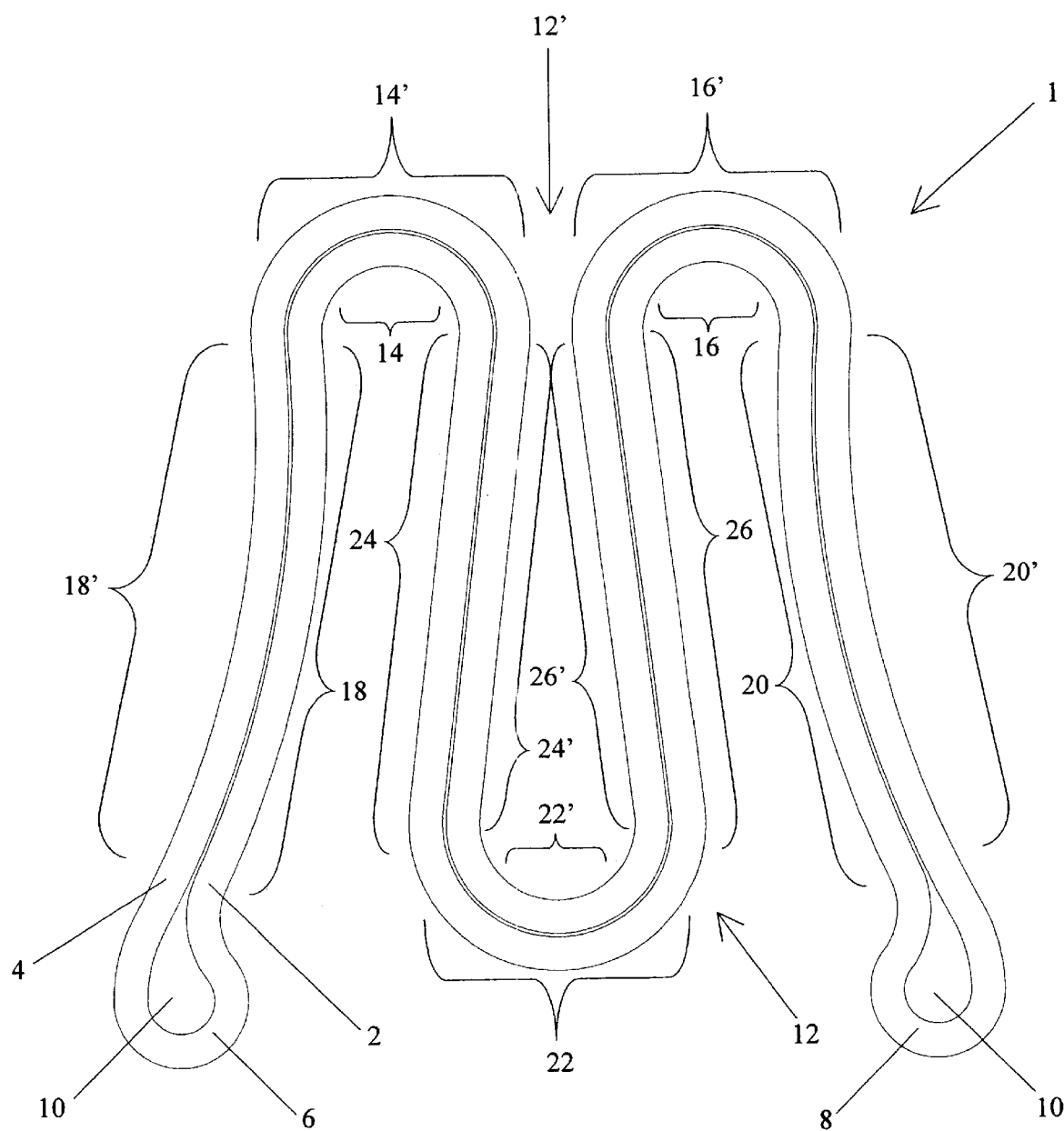
FIG. 1 is a side sectional view of a seal according to a preferred embodiment.

Referring now to a preferred embodiment of the invention depicted in FIG. 1, a seal 1 embodies a structure, which in meridional cross-section has two or more serpentine plies, which are disposed more or less adjacent to each other. Each of the serpentine plies 2, 4 of the seal 1 form one or more convolution regions (e.g., 12), at least a pair of acute bends (e.g., 14, 16), and may form leg termination regions (e.g., 6, 8) and various other regions (e.g. 18, 20, 24, 26) between any or all of the aforementioned features. The seal may be of a continuous planform outline and may be unitary.

FIG. 1 shows a cross-sectional view of a preferred embodiment of a two-ply, single convolution seal. As shown in FIG. 1 a seal 1 has a pressure-facing ply 2 and a non-pressure-facing ply 4. The plies are joined at the free ends of the seal 1 by leg termination regions 6 and 8. Leg termination regions 6 and 8 form the rounded end portions of the interstitial volume 10, which exists between the plies 2 and 4. The plies 2 and 4 are described as forming, in some embodiments, an enclosed interstitial volume 10. Due to contact between the plies 2 and 4, which may be adjacent each other and may have substantially the same convolution shape, the actual interstitial volume may be small or zero in the convolution areas, leaving in effect two interstitial volumes 10 at the leg terminations.

The pressure-facing ply 2 is comprised of a convolution region 12, two acute bend regions 14 and 16, and two leg regions 18 and 20. The convolution region 12 is comprised of a curved region 22, which can be any curved, or compound curved shape (e.g., a partial circle or a partial ellipse) and two sidewall regions 24 and 26. The sidewall regions 24 and 26 extend between the curved region 22 and acute bend regions 14 and 16, respectively. Acute bend region 14 joins sidewall region 24 with a leg region 18. Acute bend region 16 joins sidewall region 26 with a leg region 20.

The non-pressure-facing ply 4 is comprised of a convolution region 12', two acute bend regions 14' and 16', and two leg regions 18' and 20'. The convolution region 12' is comprised of a curved region 22', which can be any curved, or compound curved shape (e.g., a partial circle or a partial ellipse) and two sidewall regions 24' and 26'. The sidewall regions 24' and 26' extend between the curved region 22' and acute bend regions 14' and 16', respectively. Acute bend region 14' joins sidewall region 24' with a leg region 18'. Acute bend region 16' joins sidewall region 26' with a leg region 20'.

The pressure-facing ply 2 and the non-pressure-facing ply 4 are joined by leg termination regions 6 and 8. Leg termination region 6 joins leg region 18 with leg region 18'. Leg termination region 8 joins leg region 20 with leg region 20'.

In each of the embodiments illustrated herein, each of the serpentine plies (e.g., plies 2 and 4 in FIG. 1) are depicted as having arcuate profiles in various places. The profiles of these plies may be either straight or may be any curved, or compound curved shape, e.g., a partial circle or a partial ellipse.

Figure 8:
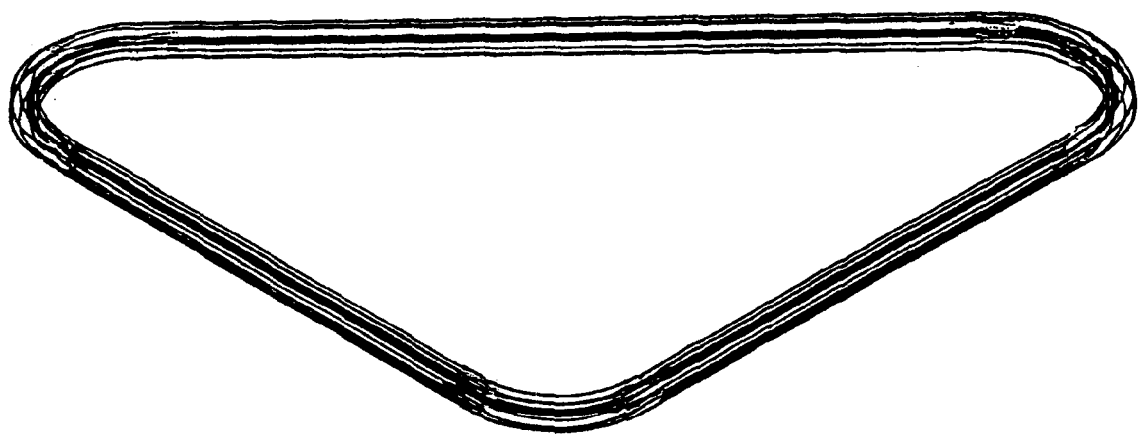
FIG. 8 illustrates an isometric depiction of a non-circular seal.

The invention provides an improved seal. It will be readily apparent to one of ordinary skill in the art that the term seal, as used herein, may refer to any number of shapes whose planform (the contour of an object as viewed from above) outline may, for example, be in the shape of an annulus (e.g., a circular ring), or in the shape of a curvilinear figure, or in the shape of a polygonal figure; where the vertices of any figure forming a seal may be, for example, arcuate in shape. An example of a non-circular embodiment of the invention disclosed herein is illustrated in FIG. 8. The seal may form, e.g. a continuous ring or a discontinuous ring.

Methods of manufacturing a seal according to preferred embodiments are described herein. However, the invention includes seals made by other methods. The first preferred embodiment of a seal 1, shown in FIG. 1, may be produced from a single piece of tube stock, such as precision metal tube stock, formed into a two ply (two layer) cross-section as shown in FIG. 1. The tube stock is formed into a partial circle, in which the two ends remain straight and are brought into general juxtaposition, so that the ends, which have been previously squared and prepared, may be butt-welded together using an autogenous T.I.G. or other suitable welding process. The weld is then roll-planished about its circumference, to reduce its bead height and cold-forge the re-cast structure, before the seal is roll-formed into a radially flattened toroidal shape. Subsequent operations progressively modify the cross-section of the seal until it adopts the shape shown in FIG. 1.

During welding a very small section on the inside surface of the seal is left unwelded, to permit air which would otherwise be trapped inside to escape rather than increase in pressure as the inside volume of the seal is reduced. This unwelded section is located in a wall which is subject only to compressive stress in service and may be sealed, by completing the weld, before final forming.

The seal thus formed is heated treated and may have its outer convex surface improved to an appropriate surface finish and shape (e.g., a virtually perfect surface of revolution) by the application of an abrasive machining process similar to grinding. A surface of revolution is used here to refer to the shape of a body generated when a defined curve or spline is rotated about an axis held motionless in space. Every element on the surface of an infinitely thin slice of a radial plane section of the body generating an elemental circle when rotated about an axis contained in such plane. Each element of said plane section of the body being bounded by an elemental circle concentric with all others about said axis. Of course, the invention can include surface shapes and finishes that do not form a surface of revolution as defined above.

Figure 2:
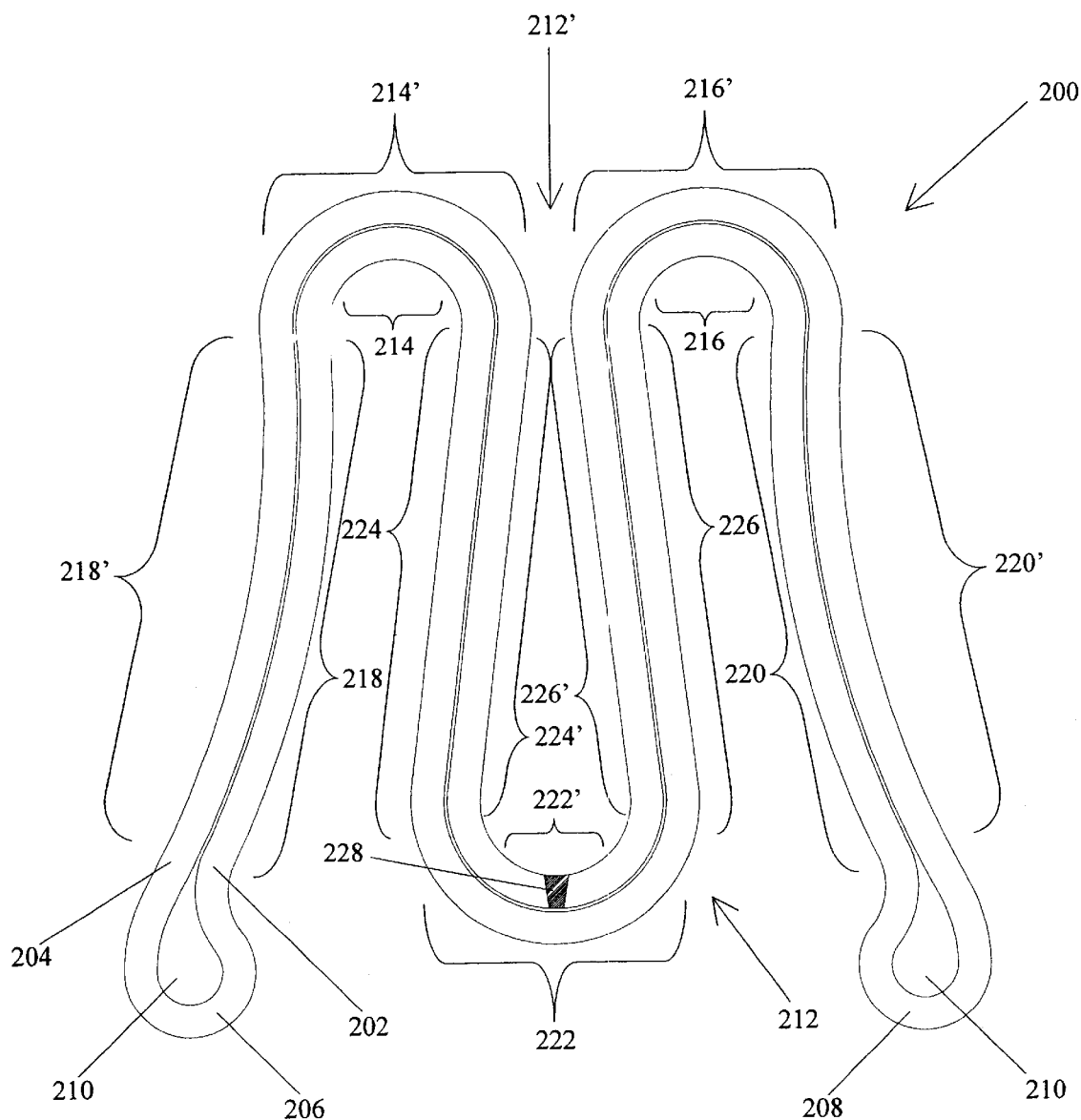
FIG. 2 is a side sectional view of a seal according to a second preferred embodiment.

A second embodiment of the present invention is depicted in FIG. 2. The raw material for this embodiment may be, for example, a single piece of strip stock, such as of precision metal or other suitable material, the thickness of which is controlled to within 3 percent of its nominal value and width of which is within ±0.002 inches. This second embodiment of the seal 200 may be produced by a method which includes a full circumferential butt-weld 228. As shown in FIG. 2, the seal 200 features a pressure-facing ply 202 and a non-pressure-facing ply 204. The plies are joined at the free ends of the seal 200 by leg termination regions 206 and 208. Leg termination regions 206 and 208 form the rounded end portions of the interstitial region 210, which exists between the plies 202 and 204.

The pressure-facing ply 202 is comprised of a convolution region 212, two acute bend regions 214 and 216, and two leg regions 218 and 220. The convolution region 212 is comprised of a curved region 222, which can be any curved, or compound curved shape (e.g., a partial circle or a partial ellipse) and two sidewall regions 224 and 226. The sidewall regions 224 and 226 extend between the curved region 222 and acute bend regions 214 and 216, respectively. Acute bend region 214 joins sidewall region 224 with a leg region 218. Acute bend region 216 joins sidewall region 226 with a leg region 220.

The non-pressure-facing ply 204 is comprised of a convolution region 212', two acute bend regions 214' and 216', and two leg regions 218' and 220'. The convolution region 212' is comprised of a curved region 222', which can be any curved, or compound curved shape (e.g., a partial circle or a partial ellipse) and two sidewall regions 224' and 226'. The sidewall regions 224' and 226' extend between the curved region 222' and acute bend regions 214' and 216', respectively. Acute bend region 214' joins sidewall region 224' with a leg region 218'. Acute bend region 216' joins sidewall region 226' with a leg region 220'.

The pressure-facing ply 202 and the non-pressure-facing ply 204 are joined by leg termination regions 206 and 208. Leg termination region 206 joins leg region 218 with leg region 218'. Leg termination region 208 joins leg region 220 with leg region 220'.

The weld 228 in the FIG. 2 embodiment 200 generally cannot be planished, except by the action of rolling during forming. Fortunately, however, the level of tensile stress transverse to the weld run (in the meridional plane) is reduced by the arrangement of the two plies connected at their ends, which results in mainly compressive stresses at the weld in the member on the inside of the bend in the meridional plane. In the circumferential direction, the stress is relatively low.

The second embodiment 200 may also be heat treated and its outer contour may preferably be improved to a virtually perfect surface of revolution by the application of an abrasive machining process similar to grinding. Of course, the invention can include surface shapes and finishes that do not form a surface of revolution as defined above.

Figure 3:
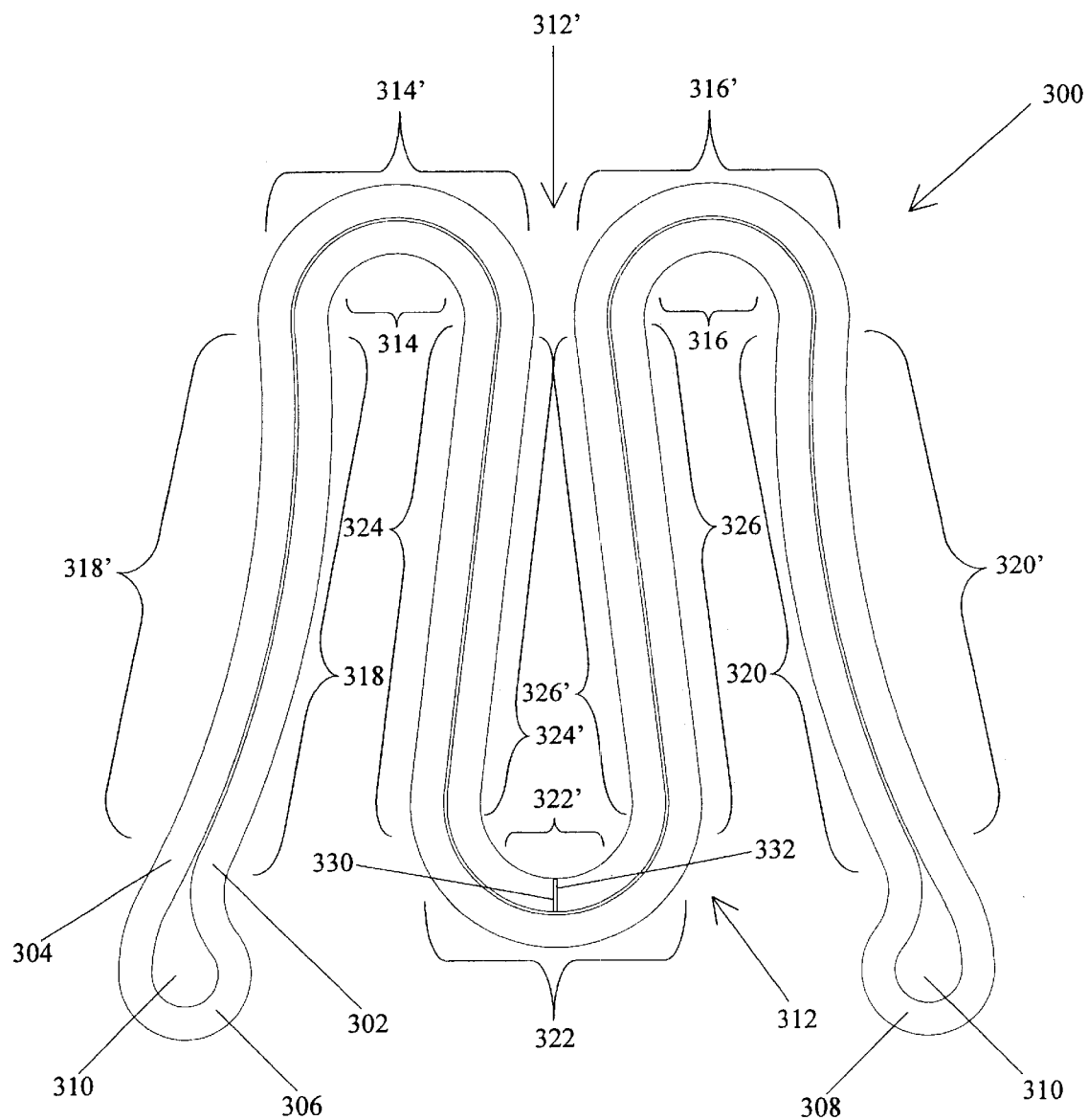
FIG. 3 is a side sectional view of a seal according to a third preferred embodiment.

A third embodiment of the present invention is illustrated in FIG. 3. This embodiment 300 may be formed from strip stock, such as precision metal strip stock, arranged so that the edges 330 and 332 of the strip are in general juxtaposition about the circumference substantially along the line of symmetry between the topmost portion of the seal cross-section and the bottommost portion of the seal cross-section. The edges 330 and 332, thus generally running circumferentially about the seal 200 in the non-pressure-facing ply 304 convolution 212' or as shown in the preferred embodiment of FIG. 3, within the curved region 322'. Edges 330 and 332 remain unwelded, in this embodiment.

As shown in FIG. 3, the pressure-facing ply 300 is comprised of a convolution region 312, two acute bend regions 314 and 316, and two leg regions 318 and 320. The convolution region 312 is comprised of a curved region 322, which can be any curved, or compound curved shape (e.g., a partial circle or a partial ellipse) and two sidewall regions 324 and 326. The sidewall regions 324 and 326 extend between the curved region 322 and acute bend regions 314 and 316, respectively. Acute bend region 314 joins sidewall region 324 with a leg region 318. Acute bend region 316 joins sidewall region 326 with a leg region 320.

The non-pressure-facing ply 304 is comprised of a convolution region 312', two acute bend regions 314' and 316', and two leg regions 318' and 320'. The convolution region 312' is comprised of a curved region 322', which can be any curved, or compound curved shape (e.g., a partial circle or a partial ellipse) and two sidewall regions 324' and 326'. The sidewall regions 324' and 326' extend between the curved region 322' and acute bend regions 314' and 316', respectively. Acute bend region 314' joins sidewall region 324' with a leg region 318'. Acute bend region 316' joins sidewall region 326' with a leg region 320'.

The pressure-facing ply 302 and the non-pressure-facing ply 304 are joined by leg termination regions 306 and 308. Leg termination region 306 joins leg region 318 with leg region 318'. Leg termination region 308 joins leg region 320 with leg region 320'. An unwelded seam is formed at the juxtaposition of edges 330 and 332 circumferentially about the seal 300 within the concavity formed in the non-pressure-facing ply's 304 convolution region 312'.

The third embodiment 300 may also be heat treated and its outer contour may be improved to a virtually perfect surface of revolution by the application of an abrasive machining process similar to grinding. Of course, the invention can include surface shapes and finishes that do not form a surface of revolution as defined above.

Figure 7:
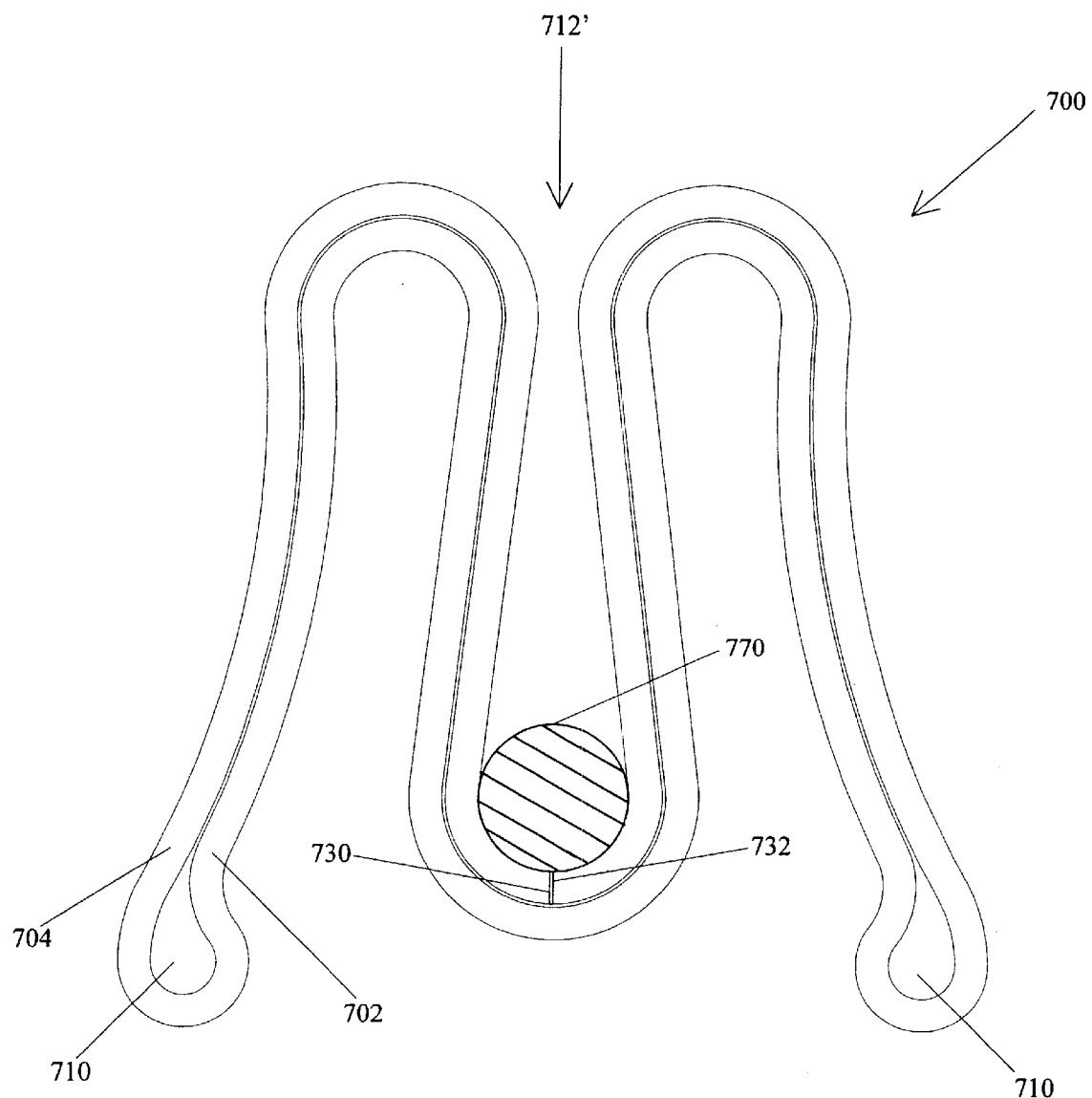
FIG. 7 is a side sectional view of a seal according to the third preferred embodiment having an additional feature to prevent the leakage of fluid into the interstitial region of the seal.

A potential advantage of the embodiment of the invention as shown in FIG. 3, is that it may have reduced manufacturing cost when compared to other embodiments, such as those depicted in FIGS. 1 and 2. During plating of this alternate embodiment 300, a suitable resilient material of appropriate cross-section may be introduced into the concavity formed in the convolution region 312' to exclude plating solution from entering between the substantially abutting edges 330 and 332 and thus prevent the penetration of plating solution into the interstitial region 310. FIG. 7, for example, depicts, in a side sectional view, a seal 700 of the type disclosed in the preferred embodiment of FIG. 3, with a resilient material of circular cross-section 770 installed within the concavity formed in the convolution region 712'. It will be readily apparent to one skilled in the art, that a suitable resilient material of any suitable cross-section may be introduced into the concavity formed in the convolution-region 712' in order to exclude any solution from entering the interstitial region 710.

Figure 4:
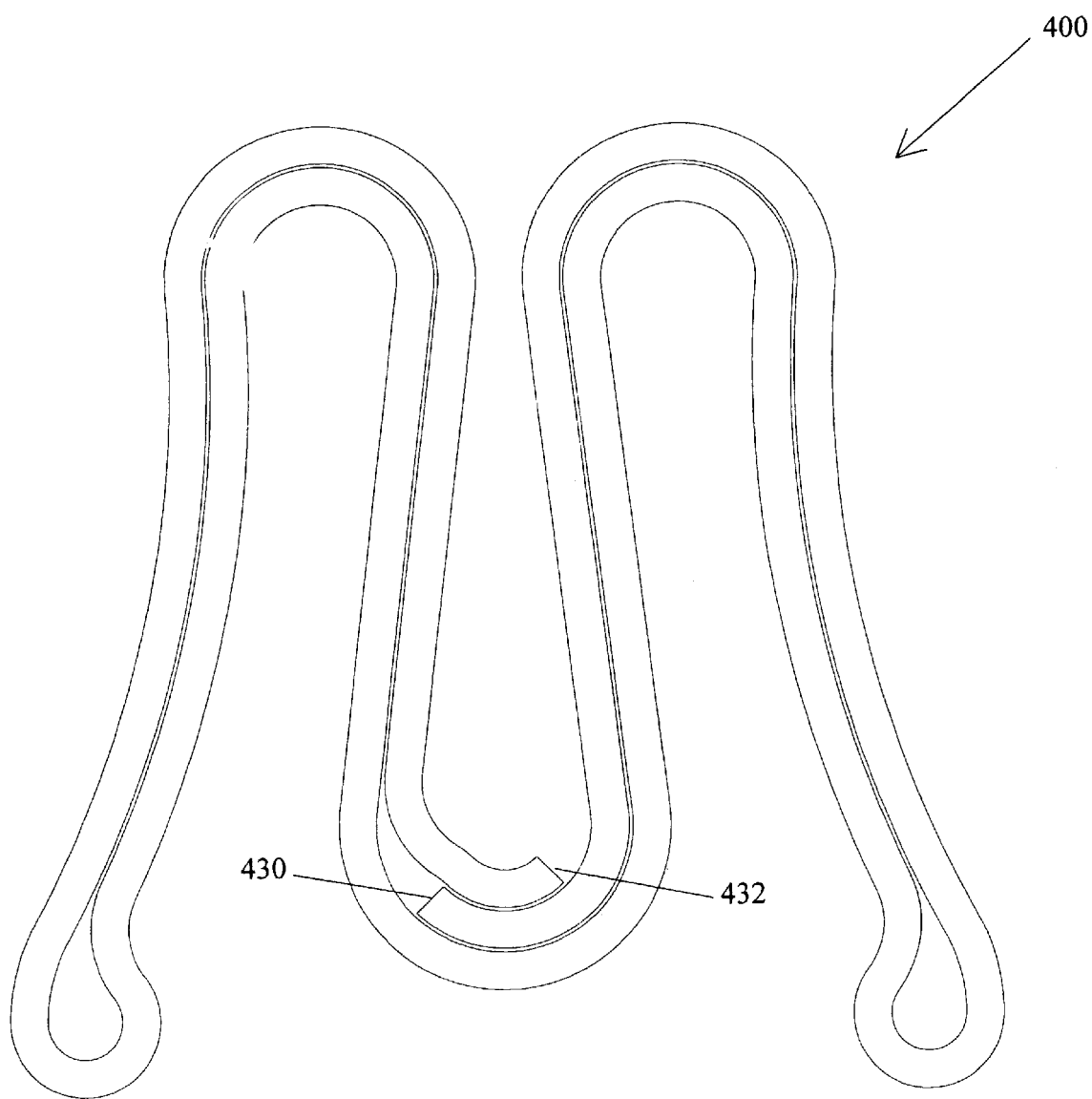
FIG. 4 is a side sectional view of a seal according to a fourth preferred embodiment.

A fourth embodiment of a seal 400 according to the present invention is depicted in FIG. 4. In the embodiment of FIG. 4, the seal 400 is essentially constructed in the same manner as the seal 300 of the third preferred embodiment, which was depicted in FIG. 3. The difference between the two embodiments is that in the embodiment of FIG. 4 the two edges 430 and 432 are overlapped and interlocking, while in the embodiment of FIG. 3 the two edges 330 and 332 were substantially abutting.

Figure 5:
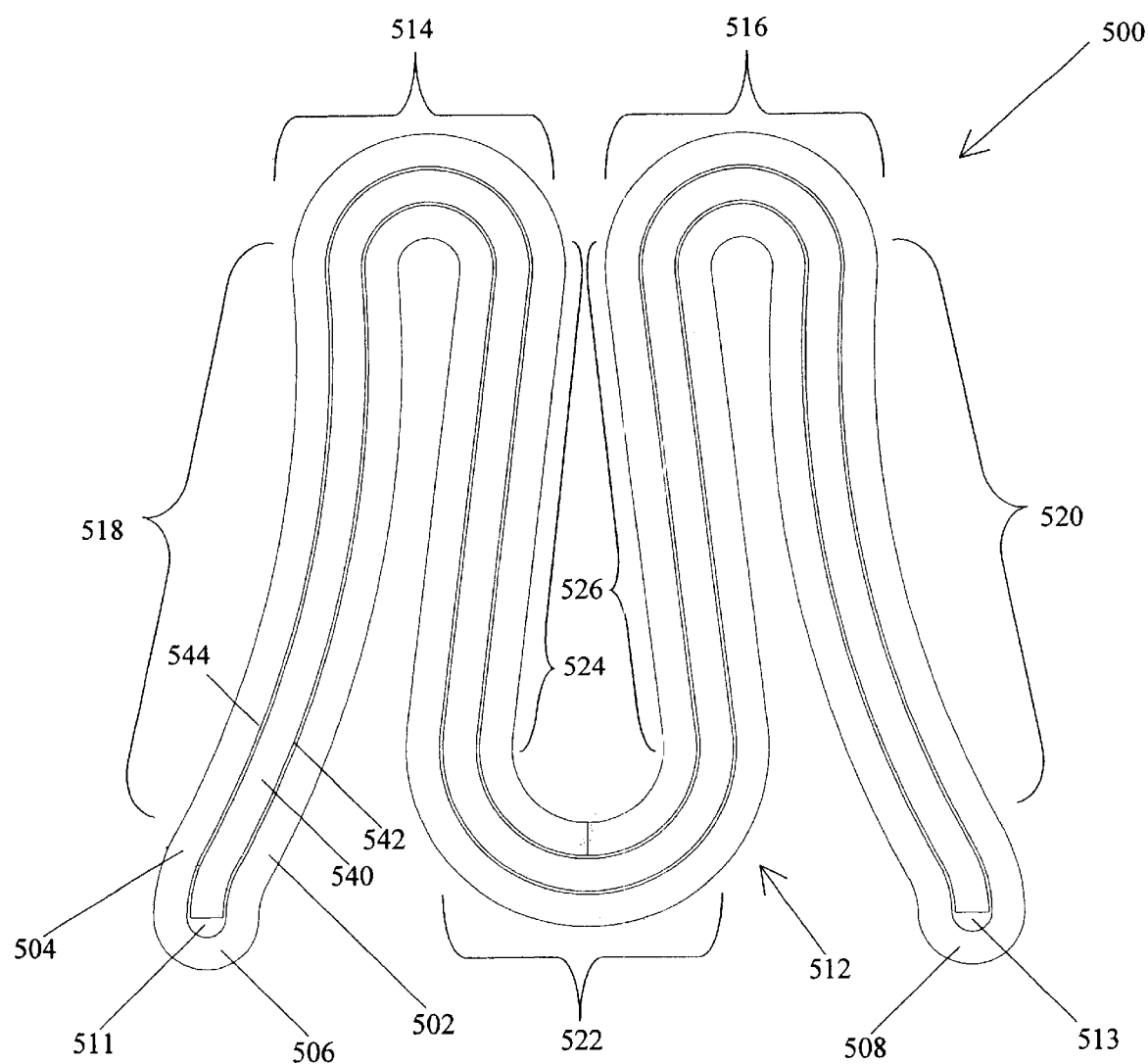
FIG. 5 is a side sectional view of a seal according to a fifth preferred embodiment.

A fifth embodiment of the present invention is depicted in FIG. 5. The embodiment of FIG. 5 illustrates a three-ply seal. In FIG. 5, each bracket and its corresponding reference number is associated with a particular region of the inter-ply ply 540 and not with any other area of the seal 500. Additionally, reference number 512 and its associated arrow-headed callout-line refers to the convolution region 512 of the inter-ply ply 540, and not to any other area toward which the arrow is pointing. This drawing convention was adopted for FIG. 5 to describe the various regions of the inter-ply ply 540 that is disposed between the pressure-facing ply 502 and the non-pressure-facing ply 504.

A seal 500, as shown in FIG. 5, is comprised of a pressure-facing ply 502, a non-pressure-facing ply 504, at least one inter-ply ply 540 disposed between the pressure-facing ply 502 and the non-pressure-facing ply 504, and leg termination regions 506 and 508. The pressure-facing ply 502 and non-pressure-facing ply 504 are described, as for example, in the embodiments of FIGS. 1 through 4. Referring now to FIG. 5, the pressure-facing ply 502 is disposed more or less adjacent to a first surface 542 of the inter-ply ply 540 while the non-pressure-facing ply 504 is disposed more or less adjacent to a second surface 544 of the inter-ply ply 540. Surface contact of adjacent plies is permitted, though not required.

An inter-ply ply 540 is comprised of a convolution region 512, two acute bend regions 514 and 516, and two leg regions 518 and 520. The convolution region 512 is comprised of a curved region 522, which can be any curved, or compound curved shape (e.g., a partial circle or a partial ellipse) and two sidewall regions 524 and 526. The sidewall regions 524 and 526 extend between the curved region 522 and acute bend regions 514 and 516, respectively. The free ends of the leg regions 518 and 520 are substantially disposed within the concavity formed by the leg termination regions 506 and 508.

The embodiment of FIG. 5 may be formed, for example, by any of the methods disclosed in the embodiments previously mentioned with the addition of at least one ply of strip material (for example the addition of the inter-ply ply 540) between the pressure-facing ply 502 and the non-pressure-facing ply 504. FIG. 5, for illustration purposes only, illustrates the cross-sectional view of a triple-ply seal 500 in which a singular ply of strip material 540 is interposed between the plies formed by the folded and formed one-piece two-ply seal as disclosed in the embodiment of FIG. 3. It will be apparent to anyone of skill in the art that, for example, any of the previously described embodiments could be used in combination with the invention described in FIG. 5. The material type and thickness of any inter-ply plies may also be different from those of the inner and outer plies. This enables seals to employ materials with varying characteristics. For example, the inner and outer plies may have higher oxidation resistance and lower high-temperature strength, whereas the inter-ply ply or plies might have higher high-temperature strength and lower oxidation resistance. The inter-ply ply or plies might also, for example, be thicker than the inner and outer plies in order to have a much higher level of the strain energy of deflection, with which to overpower the inner and outer plies in providing high springback.

Figure 6:
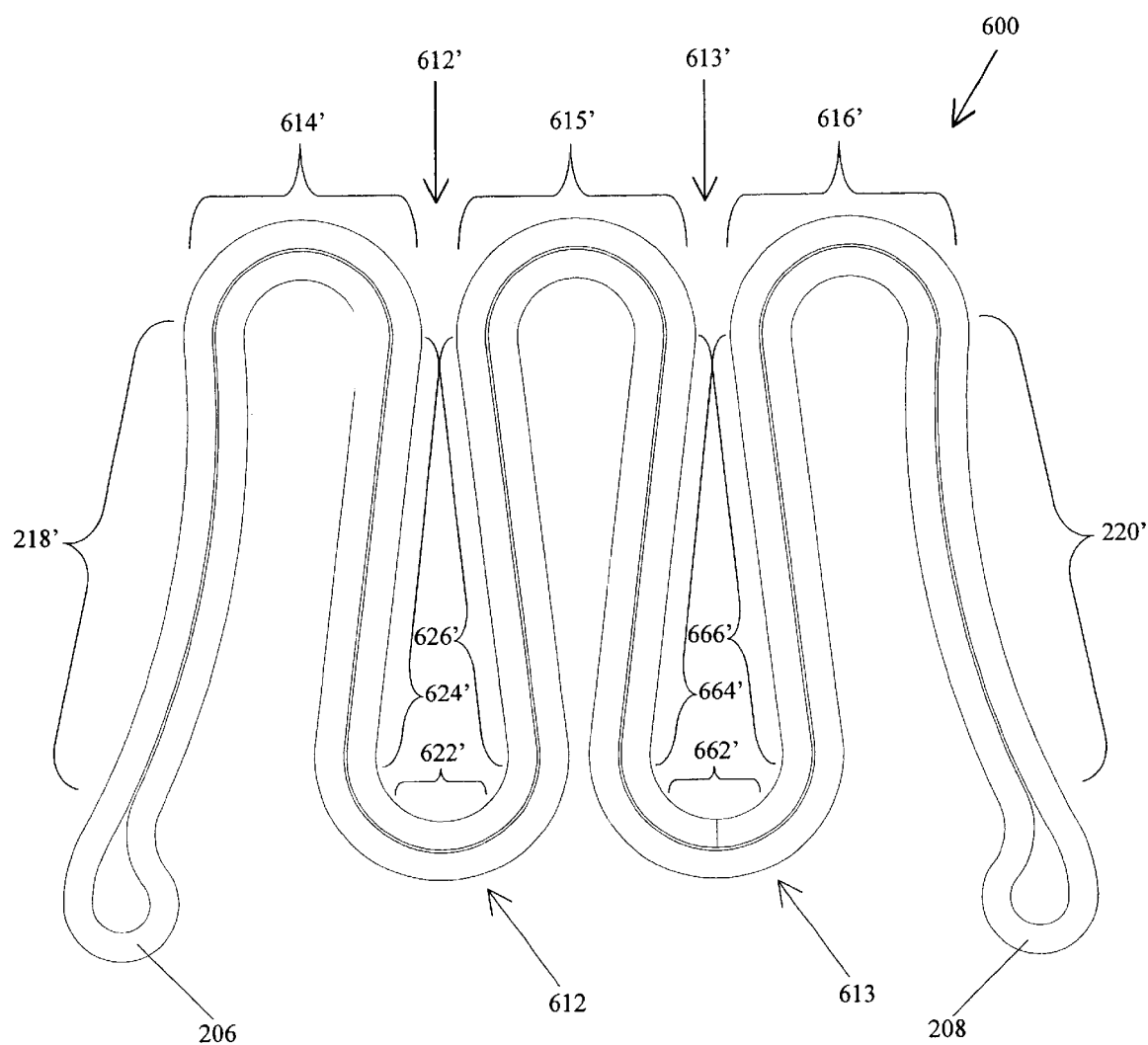
FIG. 6 is a side sectional view of a seal according to a sixth preferred embodiment.

A sixth embodiment of a seal 600 according to the present invention is shown in FIG. 6. The seal 600 is a double convolution variant of the seal 200 depicted in FIG. 2. A seal according to the present invention can be made with any number of convolutions. Multiple convolution seals, such as, for example, a seal having the general cross-section of seal 600 in FIG. 6 may be manufactured from tube stock material or sheet stock material. Each of the manufacturing techniques, describing various edge relationships, described in the embodiments of the seals exemplified in FIGS. 1 through 4 may be used to manufacture convolution multiple-ply seals (e.g., seamless circumference seal, circumferential butt-weld seal, abutting yet unwelded circumferential seal, or overlapping and interlocking circumferential seal). Multiple convolution seals, such as, for example, a seal having the general cross-section of seal 600 in FIG. 6 may be manufactured to have more than two plies, utilizing the technique disclosed in the embodiment of seal 500 of FIG. 5. It will be readily obvious to one of ordinary skill in the art that other edge relationships shown here and still other variations obvious to those skilled in the art of metal forming could also be advantageously used as alternatives to the arrangement shown.

Referring now to the sixth embodiment of the present invention as illustrated in FIG. 6. This embodiment 600 may be formed from strip stock, such as precision metal strip stock. The edges 630 and 632, run generally circumferentially about the seal 600 in either of the non-pressure-facing ply 604 convolutions 612' or 613'. As shown in the preferred embodiment of FIG. 6, the abutted edges 630 and 632 run within convolution 613' and, for illustration purposes, within the curved region 662'. In the exemplary illustration of FIG. 6, edges 630 and 632 remain unwelded. It is also permissible to have overlapping of the edges in the sidewall regions 666', 664', 626', or 624' in lieu of locating the edges 630 and 632 in the curved regions 662' or 622'. Abutting of the edges in these sidewall locations is believed to be too difficult unless the edges are welded together before forming of the convolutions commences.

As shown in FIG. 6, the pressure-facing ply 602 is comprised of a pair of convolution regions 612 and 613, three acute bend regions 614, 615, and 616, and two leg regions 618 and 620. The convolution regions 612 and 613 are each comprised of curved regions 622 and 662, respectively, which can be any curved, or compound curved shape (e.g., a partial circle or a partial ellipse) and pairs of sidewall regions 624 and 626, and 664 and 666, respectively. The sidewall regions 624 and 626 extend between the curved region 622 and acute bend regions 614 and 616, respectively. Acute bend region 614 joins sidewall region 624 with a leg region 618. Acute bend region 615 joins sidewall region 626 with sidewall region 664. The sidewall regions 664 and 666 extend between the curved region 662 and acute bend regions 615 and 616, respectively. Acute bend region 616 joins sidewall region 666 with a leg region 620.

The non-pressure-facing ply 604 is comprised of a pair of convolution regions 612' and 613', three acute bend regions 614', 615', and 616', and two leg regions 618' and 620'. The convolution regions 612' and 613' are each comprised of curved regions 622' and 662', respectively, which can be any curved, or compound curved shape (e.g., a partial circle or a partial ellipse) and pairs of sidewall regions 624' and 626', and 664' and 666', respectively. The sidewall regions 624' and 626' extend between the curved region 622' and acute bend regions 614' and 616', respectively. Acute bend region 614' joins sidewall region 624' with a leg region 618'. Acute bend region 615' joins sidewall region 626' with sidewall region 664'. The sidewall regions 664' and 666' extend between the curved region 662' and acute bend regions 615' and 616', respectively. Acute bend region 616' joins sidewall region 666' with a leg region 620'.

The pressure-facing ply 602 and the non-pressure-facing ply 604 are joined by leg termination regions 606 and 608. Leg termination region 606 joins leg region 618 with leg region 618'. Leg termination region 608 joins leg region 620 with leg region 620'.

The sixth embodiment 600 may also be heat treated and its outer contour may be improved to a virtually perfect surface of revolution by the application of an abrasive machining process similar to grinding. Of course, the invention can include surface shapes and finishes that do not form a surface of revolution as defined above.

Figure 9A:
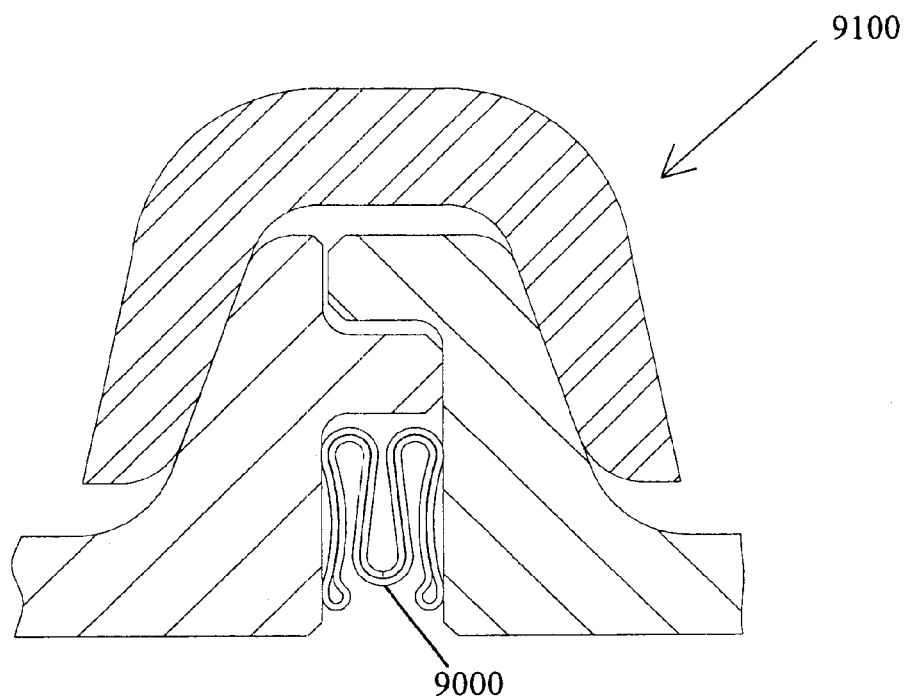
FIG. 9A depicts a side sectional view of a seal according to the present invention in a nominal sealing joint.
Figure 9B:
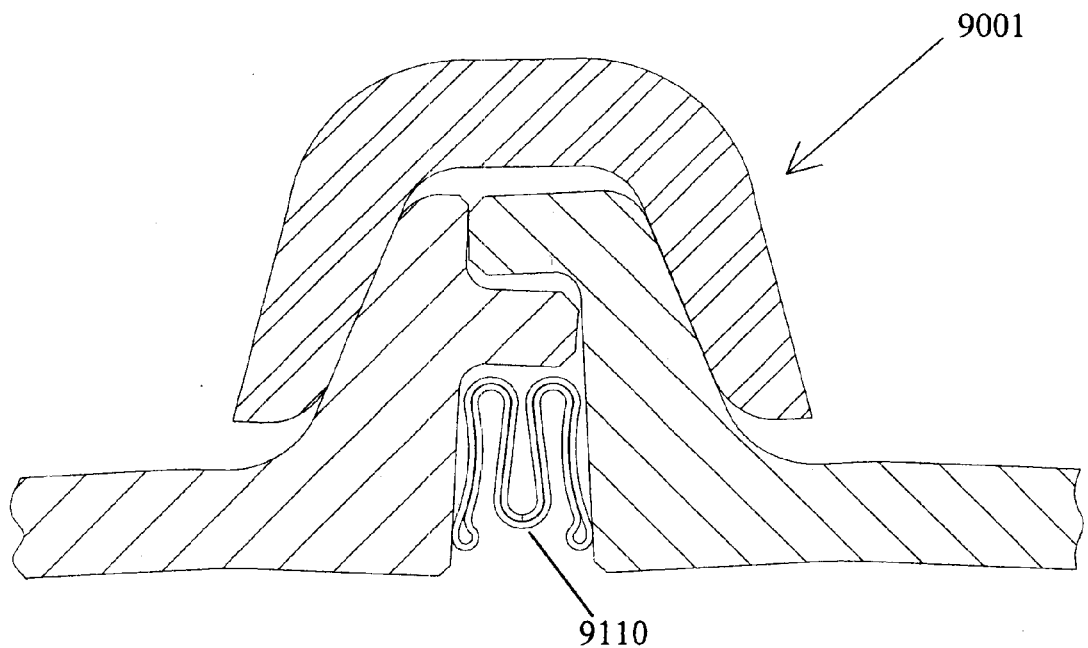
FIG. 9B depicts a side sectional view of a seal according to the present invention in a deformed sealing joint.
Figure 10:
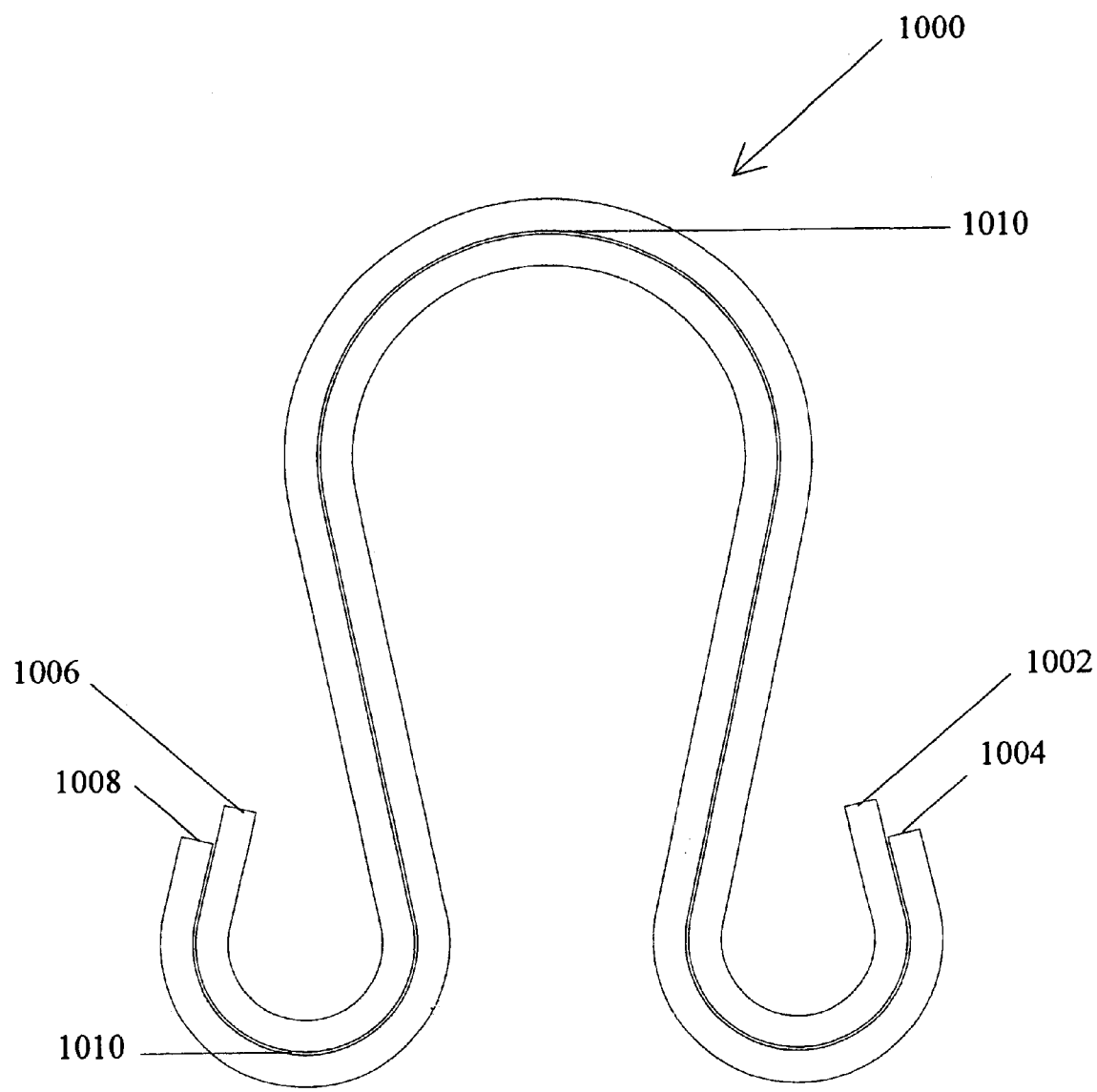
FIG. 10 depicts a cross-section of prior art seal.

FIGS. 9A and 9B illustrate a seal of the present invention installed in two examples of ducting joints. FIG. 9A illustrates a seal 9000 installed in a nominal joint 9100, while FIG. 9B illustrates the superior functioning of a seal 9110 installed in a weld-distorted or axially overloaded joint 9001. Welding of lightweight flanges to ducting almost invariably causes slight deformation of the flanges and a loss of planarity of their sealing surfaces. In some cases, the deformation may be severe and localized, due, for example, to the close proximity of the weld joint to tight bends in the ducting, such as an elbow section. Severe deformation is often caused as well by localized repair of defective welds or cracks in the fabrication process or in maintenance repairs. Localized welding causes non-uniform stresses around the circumference of annular flange to ducting joints upon contraction of molten weld metal.

Seals of the present invention may be sufficiently resilient to accommodate normal weld deformation of the sealing surfaces of co-operating flanges and are also able to bridge widening gaps caused by severe flange distortion. Excessive distortion has become increasingly frequent with the advent of modern wide-body airliners and military heavy lift aircraft with their larger duct sizes. A contributory cause of the transition to larger duct sizes has been the reduction in the number of engines powering large aircraft and the consequential need to bleed greater quantities of air from fewer engines (the quantity of compressed air needed being proportional to aircraft size and volume regardless of the number of engines available to supply it.)

The seals in the preferred embodiments above are preferably formed of metal, such as a nickel-base metal alloy, but may be alternatively formed of any suitable material without departing from the invention.

Multiple-ply seals can be capable of higher deflection within the limiting stress imposed by available and suitable materials. Multiple-ply, convolution seals can have the highest deflection capability of all, because they are therefore able to expand axially, to accommodate both local and general increases in the width of the sealing gland or cavity.

Seals of the present invention may be advantageously employed in high-pressure bleed-air ducting joints, connecting engine compressor bleed-ports to valves, heat exchangers, thermal anti-icing systems and other systems needing for their operation a source of compressed air, at pressures up to 600 psig and temperatures to 1300° F.

The invention relates to resilient seals, and may be used, e.g., with sealing rings with high deflective capability including pressure-energized, convolution, multiple-ply type sealing rings. Some seals according to the invention may be, for example, particularly suitable for use in all types of gas turbine engines, in which thermal expansion of internal components and assemblies results in variable distance gaps between the sealing faces of cooperating sealing members. These gaps must be sealed under all operating conditions to prevent, for example, the escape of high temperature working gases from their intended flow paths, leading to loss of efficiency and overheating of critical components. The present invention provides in some embodiments, multiple-ply, convolution seals that have outstanding deflection capability and are sufficiently resilient to accommodate, for example, gaps caused by both normal and severe weld deformation of cooperating sealing surfaces of flanges.

While various embodiments have been described to illustrate the present invention, it will be understood by those skilled in the art that various modifications and changes can be made therein without departing from the scope of the invention as defined in the appended claims.

What is claimed is:

1. A method for providing a seal between two components comprising:

providing a multiple ply seal between the components having a first ply region and a second ply region, wherein the first ply region includes a first convolution region and the second ply region includes a second convolution region;

preventing interstitial pressure between the first ply region and the second ply region by providing a pair of leg termination regions;

the pair of leg termination regions each having rounded end portions defining an interstitial volume and each of said leg termination regions joining the first ply region to the second ply region to form a substantially enclosed envelope there between;

providing a third ply disposed between the first and second plies and within the envelope; and compressing the multiple ply seal between the components.

2. The method according to claim 1, wherein the multiple ply seal is a unitary seal.

3. The method according to claim 1, wherein the first convolution region includes a curved region and two sidewall regions and wherein the second convolution region includes a curved region and two sidewall regions.

4. The method according to claim 1, wherein the first and second convolution regions of the first and second plies respectively, have substantially the same convoluted shape.

5. A method for providing a seal between two components comprising:

providing a multiple ply seal between the components having a first ply region, two first acute bend regions, and two first leg regions, a first convolution region having a first curved region, and two first sidewall regions extending therefrom, and each said first acute bend region joining the first sidewall regions with one of the first leg regions, the multiple ply seal having a second ply region, two second acute bend regions, and two leg regions, a second convolution region having a second curved region, and two second sidewall regions extending therefrom, and each said second acute bend regions joining the second side wall region with one of the second leg regions;

preventing interstitial pressure between the first ply region and the second ply region by providing a pair of leg termination regions located in spaced apart relation to the first and second convolution regions;

the pair of leg termination regions each having rounded end portions defining an interstitial volume, each of said leg termination regions joining the first ply region to the second ply region to form a substantially enclosed envelope there between;

the first and second convolution regions of the first and second plies, respectively have substantially the same convoluted shape; and compressing the multiple ply seal between the components.

6. The method according to claim 5, wherein the multiple ply seal further comprises a third ply region disposed between the first and second ply regions.

7. The method according to claim 6, wherein the multiple ply seal is a unitary seal.

* * * * *